(12) United States Patent
Bock et al.

(10) Patent No.: US 10,547,405 B1
(45) Date of Patent: Jan. 28, 2020

(54) MULTI-MODE WAVELENGTH DIVISION MULTIPLEXING FOR FREE-SPACE OPTICAL COMMUNICATIONS

(71) Applicant: LOCKHEED MARTIN CORPORATION, Bethesda, MD (US)

(72) Inventors: Kevin Richard Bock, San Jose, CA (US); Aniruddha R. Karmarkar, San Jose, CA (US); Gregory Samuel Feller, Kentfield, CA (US); Christopher William Tischhauser, Campbell, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/462,762

(22) Filed: Mar. 17, 2017

(51) Int. Cl.
  *H04J 14/02* (2006.01)
  *H04B 10/2581* (2013.01)
  *H04B 10/11* (2013.01)
  *H04B 10/66* (2013.01)
  *H04B 10/40* (2013.01)
  *H04B 10/29* (2013.01)

(52) U.S. Cl.
  CPC ............ *H04J 14/021* (2013.01); *H04B 10/11* (2013.01); *H04B 10/2581* (2013.01); *H04B 10/29* (2013.01); *H04B 10/40* (2013.01); *H04B 10/66* (2013.01)

(58) Field of Classification Search
  None
  See application file for complete search history.

(56) References Cited

U.S. PATENT DOCUMENTS

| | | | | |
|---|---|---|---|---|
| 4,406,513 A * | 9/1983 | Raphael | ................. | H04B 10/29 385/16 |
| 4,558,921 A * | 12/1985 | Hasegawa | ................. | H01S 5/50 385/39 |
| 6,621,632 B2 * | 9/2003 | Zhou | ................. | G02B 6/29358 359/577 |
| 6,631,134 B1 * | 10/2003 | Zadikian | ............ | H04J 14/0227 370/252 |
| 2002/0012139 A1 * | 1/2002 | Willebrand | ........ | H04B 10/1125 398/115 |
| 2002/0028043 A1 * | 3/2002 | Medved | ................. | H04B 10/11 385/39 |
| 2002/0168160 A1 * | 11/2002 | Hirano | ............... | G02B 6/03666 385/123 |
| 2016/0036520 A1 * | 2/2016 | Swinkels | ............... | H04B 10/03 398/1 |

* cited by examiner

*Primary Examiner* — David W Lambert
(74) *Attorney, Agent, or Firm* — Morgan, Lewis & Bockius LLP (57) ABSTRACT

A multi-mode wavelength-division multiplexing (WDM) receiver includes a receiver head to receive a free-space optical (FSO) signal. A multi-mode demultiplexers (demux) is coupled to the receiver head via a multi-mode fiber to generate a number of optical signals based on the FSO signal. A number of repeaters modify the optical signals and generate a number of single-mode optical signals.

17 Claims, 6 Drawing Sheets

MULTI-MODE WAVELENGTH DIVISION MULTIPLEXING FOR FREE-SPACE OPTICAL COMMUNICATIONS

STATEMENT REGARDING FEDERALLY SPONSORED RESEARCH OR DEVELOPMENT

Not applicable

FIELD OF THE INVENTION

The present invention generally relates to free-space optical communications, and more particularly, to a multi-mode wavelength division multiplexing for free-space optical communications.

BACKGROUND

Free-space optical (FSO) communications can enable high-speed wireless communications over a sizable range (e.g., many kilometers). In terrestrial applications, FSO communications can achieve very high (e.g., more than 10 Gbps) data rates without the need to lay fiber-optic cable. Unlike communications over fiber-optic environment, FSO communications has to deal with atmospheric turbulence, which causes substantial phase and amplitude fluctuations of the FSO signal.

One approach for an FSO communications system to mitigate the phase effects is to use direct detect encoding schemes, such as an on-off-keying (OOK), paired with relatively large high-rate avalanche photo-diodes (APDs). An APD can be coupled to a multi-mode fiber (MMF) with a relatively large (e.g., larger than 50 µm) fiber core diameter. The large fiber core of a MMF allows an FSO terminal to become relatively less sensitive to phase effects in the aperture (e.g., for relatively small apertures) than for systems that use single-mode fiber (SMF). The MMF does not lend itself to the types of network architectures that have been implemented in telecommunications applications using wavelength-division multiplexing (WDM) and optical add-drop modules (OADMs). The WDM and OADM devices are built for single-mode fibers (SMFs), which are not appropriate for direct-detect FSO communication system. This is because using the SMFs in FSO communication systems based on direct-detect schemes would introduce a substantial (e.g., 15 to 20 dB) loss to the system.

SUMMARY

In some aspects, a multi-mode wavelength-division multiplexing (WDM) includes a receiver head to receive a free-space optical (FSO) signal. A multi-mode demultiplexer (demux) is coupled to the receiver head via a multi-mode fiber to generate a number of optical signals based on the FSO signal. A number of repeaters modify the optical signals and generate a number of single-mode optical signals.

In some other aspects, a multi-mode WDM transceiver is provided. The multi-mode WDM transceiver includes a receiver head to receive a FSO signal. A multi-mode reconfigurable optical add-drop module (ROADM) is provided to generate a number of single-mode optical signals based on the FSO signal. A number of single-mode optical amplifiers are coupled to the multi-mode ROADM to amplify one or more of the single-mode optical signals for transmission via one or more single-mode fibers to one or more transmission heads.

In yet other aspects, a method of providing multi-mode WDM receiver includes providing a receiver head to receive a FSO signal. A multi-mode demux is coupled to the receiver head via a multi-mode fiber. The multi-mode demux generates multiple optical signals based on the FSO signal. A number of repeaters are provided to convert the optical signals to several single-mode optical signals.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to a method and configurations for providing a multi-mode (MM) reconfigurable optical add-drop module (ROADM). The MM ROADM of the subject technology leverages a MM wavelength-division multiplexing (WDM) demuliplexer (demux) to enable advanced free-space optical (FSO) network topologies at high data rates (e.g., multi-GHz frequencies). For FSO communication systems, using MM fiber (MMF) provides a significant advantage in mitigating atmospheric turbulence effects.

In some aspects, the subject technology uses a narrow channel spacing (e.g., less than 400 GHz) demux and pairs that with a repeater for the ROADM.

In some aspects, the channel wavelengths are limited to the C-band (1530-1560 nm) and the L-band (1565-1625 nm) to allow the use of erbium doped fiber amplifier (EDFA) devices to achieve a desired transmit power for FSO transmissions. Once the channels are split by color (e.g., wavelength) in a MM WDM demux, they enter a MMF optical switch which can route the signals either to the modem, or the repeater, depending on the network topology. In one or more aspects, the repeater is an optical-electrical-optical repeater. An entirely optical repeater (e.g., with no optical-to-electrical (O-E) and electrical-to-optical (E-O) conversion) may not be attractive in this scenario as high gain multi-mode amplifiers may be difficult to make and may not be available in the wavelengths of interest. The repeater may include a high data rate detector to convert optical signals to electrical signals, electronic circuits to reshape (e.g., re-square and re-clock) the electrical signals, and a low-power single-mode fiber (SMF) transmitter. The low-power SMF transmitter re-encodes the reshaped electrical signal into output light (e.g., optical signals). It is imperative that the transmitter be single mode to enable the use of commercially produced EDFAs and SMF WDM multiplexers (muxes), such as arrayed waveguide grating muxes for the transmit portion of an FSO link.

The proposed solution has significant advantages over the previous solutions. An example advantageous feature of the subject technology is the substantially improved insertion losses. By keeping the received light entirely in MMF, the disclosed solution offers 15 to 25 dB improvement over single-mode solutions, depending on the free-space turbulence conditions. This allows the disclosed system to transmit higher data rates while maintaining transmitted laser power at an eye-safe level. The disclosed ROADM repeater architecture also significantly reduces the latency compared to a system where the modem has to process all or nearly all of the incoming data and then retransmit the packets that have separate destinations.

Figure 1A:
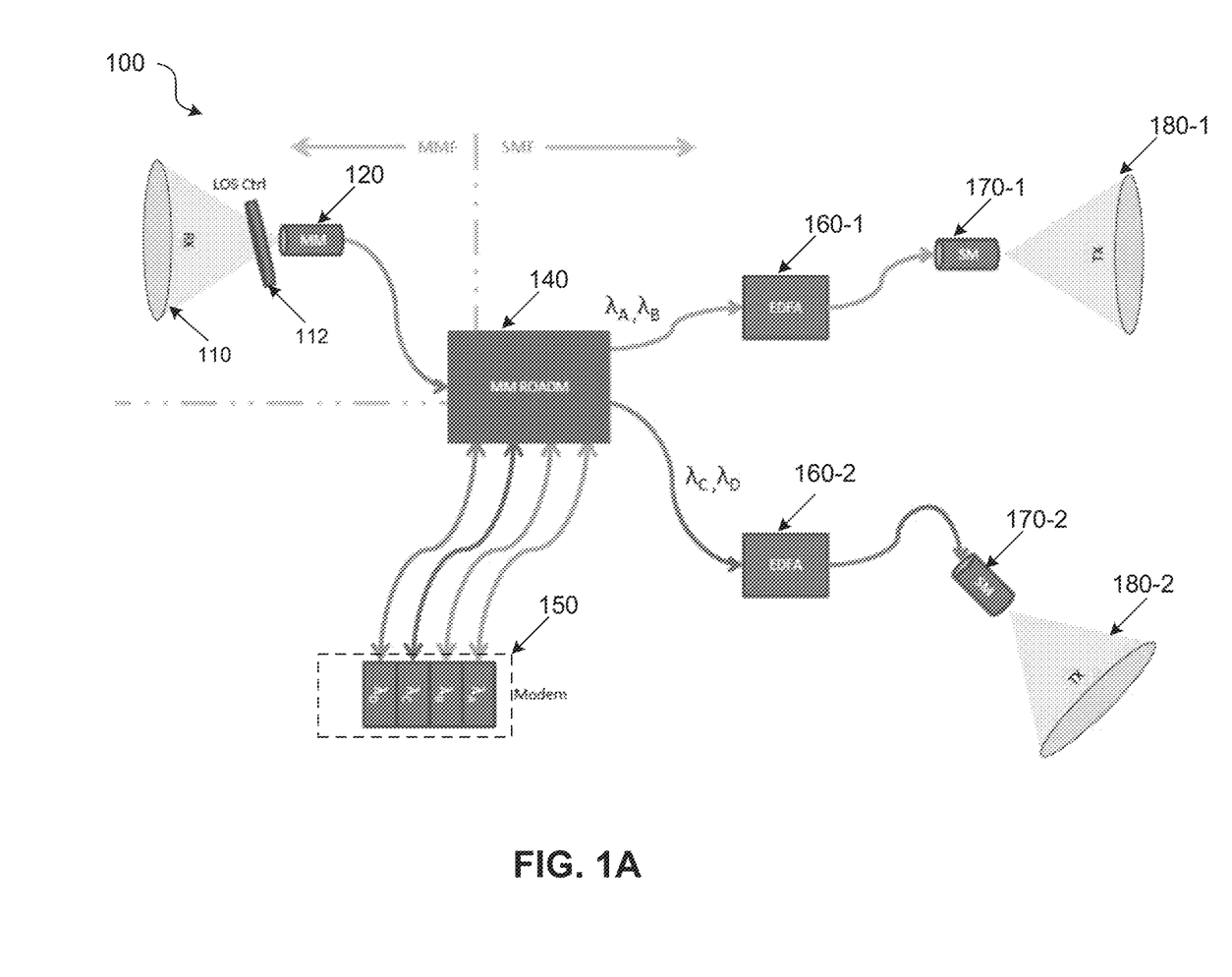
FIG. 1A is a high-level diagram illustrating an example architecture of a free-space optical (FSO) communication system including a multi-mode reconfigurable optical add-drop module (ROADM), according to certain aspects.

FIG. 1A is a high-level diagram illustrating an example architecture of a free-space optical (FSO) communication system 100 including a multi-mode reconfigurable optical add-drop module (ROADM) 140, according to certain aspects of the subject technology. The FSO communication system 100 includes a receiver head 110, a line-of-sight (LOS) controller 112, a multi-mode fiber (MMF) 120, the multi-mode ROADM 140, a modem 150, a number (e.g., two) of EDFA devices 160 (e.g., 160-1 and 160-2), one or more SMFs 170 (e.g., 170-1 and 170-2), and one or more transmission heads 180 (e.g., 180-1 and 180-2). The receiver head 110 may include one or more optical lenses that can focus the incoming beam of light into the MMF 120. In some aspects, the optical lenses can have a diameter of approximately 50 mm and be positioned at a distance of about 150 mm (e.g., an f-number of 3) from the face of the MMF 120. In one or more embodiments, due to the changes in the line of sight of the incoming beam of light (e.g., on the order of 100 micro-radians) the LOS controller 112 is used to adjust the LOS.

The light output of the MMF 120 is received by the multi-mode ROADM 140, which can process the input light signal including dividing the input light signal into multiple components (e.g., channels) with different wavelengths, using WDM technology, and reconditioning each component, as discussed in more detail below. Some of the reconditioned channels of input light signal may be dropped, using WDM technology, for processing at the modem 150. The modem 150 can convert optical signals to electrical signals and digitize the electrical signals for use at a node of an optical network and vice versa convert electrical data into optical signals. The node of the network can be a location of an entity (e.g., home, business, enterprise, and the like) hosting the modem 150 that can use the electrical data (e.g., over an Ethernet line). The modem 150 can also convert electrical data received from users at the node to optical signals and send the optical signals to the MM ROADM 140 for FSO transmission. The reconditioned components of input light signal are made ready to be fed into one or more EDFA devices 160, for example, through single-mode fibers. In one or more aspects, the coupling between the multi-mode ROADM 140 and the EDFA devices 160 may be through other means than single-mode fibers.

In one or more aspects, the light signals fed into each EDFA devices 160 may include one or more optical wavelengths (e.g., one or more of $\lambda_A$, $\lambda_B$, $\lambda_C$, and $\lambda_D$) each representing an optical channel. Each EDFA device amplifies a respective received light signal to a desired level for transmission via the transmission heads 180. It is noted that EDFA devices are single-mode optical amplifiers, and the subject technology uses WDM technology to provide the single-mode signal for amplification by EDFA devices to the desired level for transmission. The amplified light signals from the EDFA devices are provided to the transmitter heads 180 via SMFs 170. Each transmitter head 180 includes one or more optical lenses and can convert the light output from one of the SMFs 170 to a nearly collimated beam for transmission through free space to a target receiver.

Figure 1B:
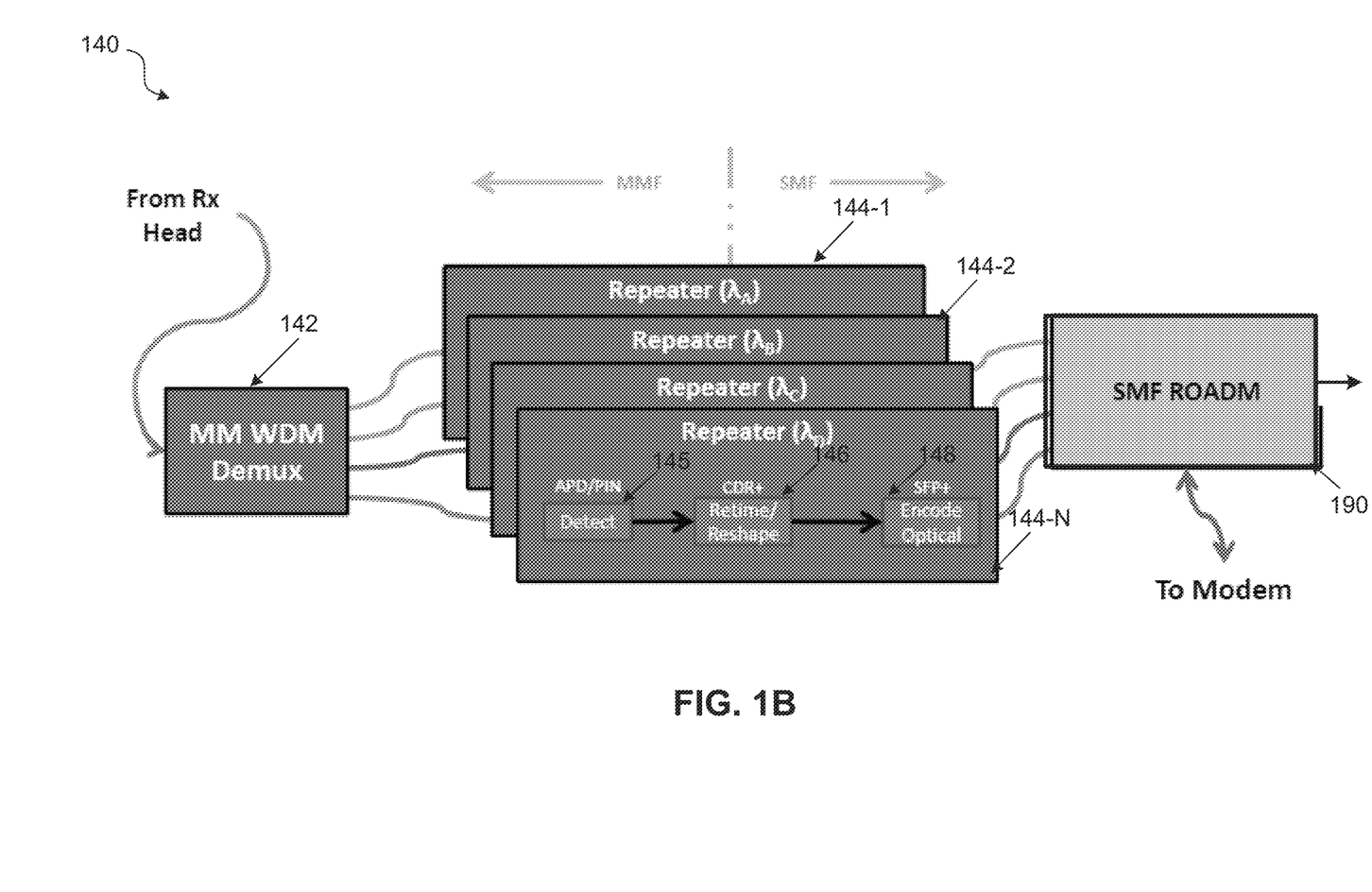
FIG. 1B is a diagram illustrating an example architecture of a multi-mode ROADM of the FSO communication system of FIG. 1A, according to certain aspects.

FIG. 1B is a diagram illustrating an example architecture of a multi-mode ROADM 140 of the FSO communication system 100 of FIG. 1A, according to certain aspects of the subject technology. The multi-mode ROADM 140 includes a multi-mode WDM demux 142, a number of repeaters 144 (e.g., 144-1, 144-2 . . . 144-N), and a SMF ROADM 190. The WDM demux 142 is coupled to the receiver head 110 via the MMF 120. The WDM demux 142 can demultiplex the optical signal received from the MMF 120 into a number N (e.g., 8, 16, 32, or more) of optical signal channels with distinct wavelengths (also referred to as "colors"). In some embodiments, the WDM demux 142 can be a thin-film based or a Bragg-grating based WDM demux (e.g., a dense WDM (DWDM) demux).

Each optical signal channel from the WDM demux 142 has a specific optical wavelength and is sent to a repeater 144 (e.g., 144-1) for reconditioning. In some embodiments, the count of the repeaters is equal to the count of the optical signal components of the WDM demux 142 (e.g., 8, 16, 32, or more). Each repeater 144 includes an optical detector 145, a clock-and-data recovery (CDR) circuit 146, and an optical encoder 148. In some aspects, the optical detector 145 can be a photo-diode such as an avalanche photo-diode (APD). The optical detector 145 generates an electrical signal (e.g. electrical current or electrical voltage when the detector includes a trans-impedance amplifier (TIA)), the amplitude of which is proportional to an intensity of the incident light signal (e.g. optical signal component from the WDM demux 142). The electrical signal generated by the optical detector 145 can be reconditioned (retimed and/or reshaped) to correct for signal aberrations, for example, due to free-space turbulences and circuit delays and/or noise. The reconditioned electrical signal from the CDR circuit 146 is encoded into an optical signal by the optical encoder 148.

The optical signals from the optical encoder 148 are fed into the SMF ROADM 190 via a number of single-mode fibers. In one or more embodiments, the SMF ROADM 190 is WDM or DWDM ROADM and can be reconfigured to drop one or more optical channels at a modem (e.g., 150) and forward all or nearly all of the channels for amplification (e.g., by an EDFA such as the EDFA device 160-1) and transmission (e.g., via the transmitter head 180-1). In one or more implementations, the reconfiguration of the SMF ROADM 190 can be performed by a processor, for example a local general processor or a microcontroller, not shown in FIG. 1B for simplicity.

Figure 2:
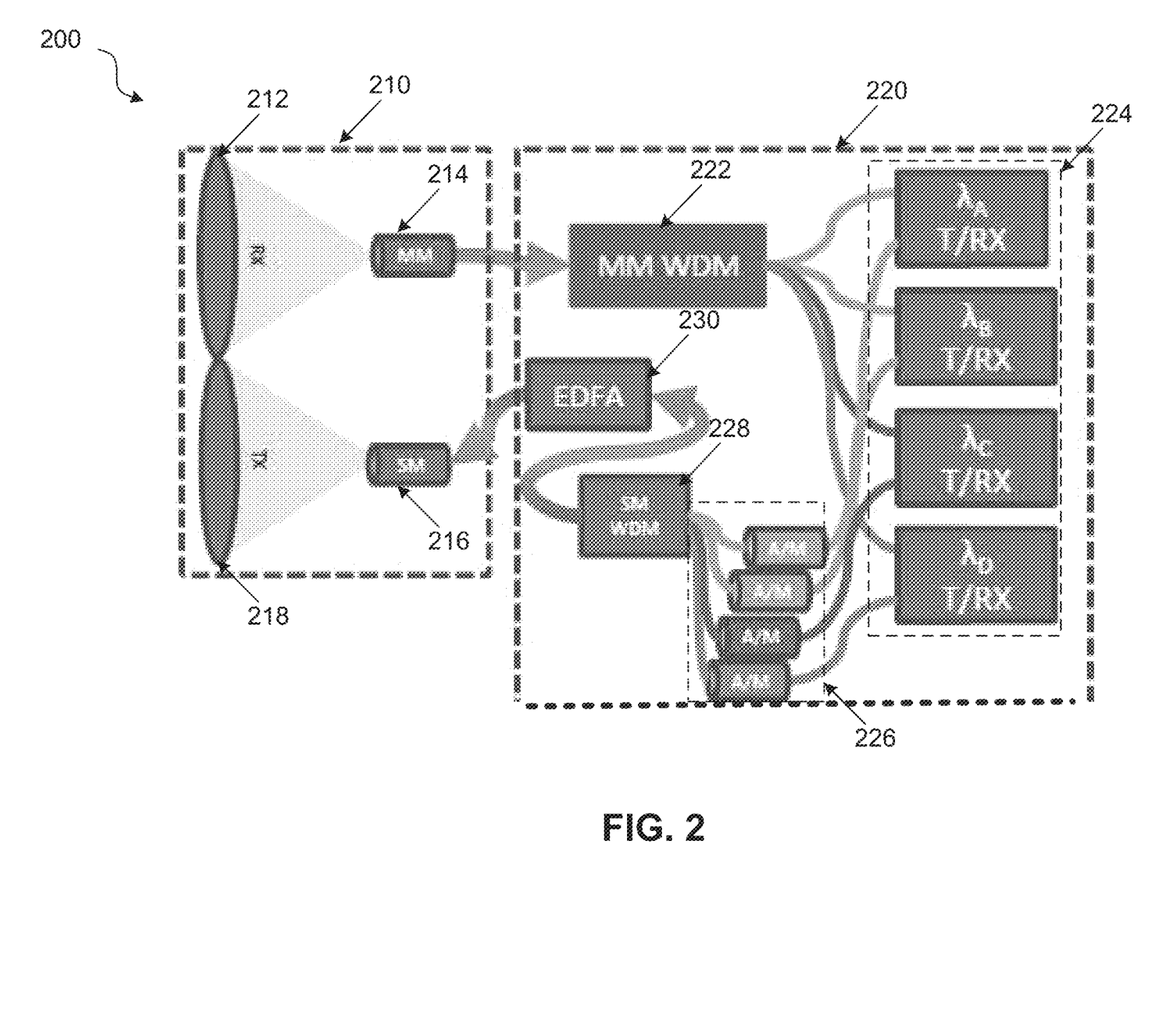
FIG. 2 is a diagram illustrating an example architecture of a multi-mode wavelength division multiplexing (WDM) FSO transceiver, according to certain aspects.

FIG. 2 is a diagram illustrating an example architecture of a multi-mode WDM FSO transceiver 200, according to certain aspects of the subject technology. The multi-mode WDM FSO transceiver 200 is an all-optical and multi-channel (e.g., 4, 8, 16, 32, or more channels) transceiver that can provide a significantly larger bandwidth (e.g., 160 GHz for 16 channels) than a single channel transceiver (e.g., with 10 GHz bandwidth). The multi-mode WDM FSO transceiver 200 includes transceiver head 210 and the transceiver circuit 220. The transceiver head 210 includes receiver head 212 and the transmitter head 218 which can receive and transmit optical signals from and into the free space. Structurally, the receiver head 212 and the transmitter head 218 are similar to the receiver head 110 and the transmitter head 180 of FIG. 1A described above. The receiver head 212 and the transmitter head 218 are respectively coupled to the transceiver circuit 220 via a MMF 214 and a SMF 216.

The transceiver circuit 220 includes a MM WDM module 222, a converter 224, an amplitude modulation (A/M) circuit 226, a SM WDM module 228, and an EDFA device 230. In one or more aspects, the MM WDM module 222 can be a MM DWDM module. In some aspects, the MM WDM module 222 can be a thin-film based or Bragg-grating based demux that allows a number of (e.g., 4-16 or more) channels (e.g., optical wavelengths) entered through a single relatively large (e.g., larger than 50 μm) core MMF be split into individual channels based on the optical wavelength. The narrow channel spacing (e.g., 200 GHz) of the disclosed MM WDM demux allows for pairing with multiple (e.g., 4-16 or more) channels across a communication band (e.g., C-band including 1530 nm-1560 nm). The converter 224 is an optical-to electrical (O-E) or electrical-to-optical (E-O) converter, and may process one or more of the channels for local Ethernet use and send some or all of the channels to the A/M circuit 226.

The A/M circuit 226 includes a number N (e.g., 4-16 or more) of modules each processing a separate channel. In some aspects, the processing includes light intensity amplification and pulse position modulation (PPM). In PPM, a number M of message bits can be encoded by transmitting a single pulse in one of $2^M$ possible required time-slots. This can be repeated every T seconds, such that the transmitted bit rate is M/T bits per second. The SM WDM module 228 can be WDM multiplexer (Mux) that can combine (multiplex) the optical signals (channels) from the A/M circuit 226 into a single optical signal including the combined channels (e.g., 4-16 or more). The single optical signal is carried via a single-mode fiber to the EDFA 230 for amplification. The amplified optical signal from the EDFA 230 is fed through SMF 216 to the transmitter head 218 for FSO transmission to a target (e.g., a next node of the optical network). In some embodiments, the EDFA 230 can be replaced with a Raman optical amplifier, for example, if the L-band (e.g., 1565-1625 nm) is used.

Figure 3:
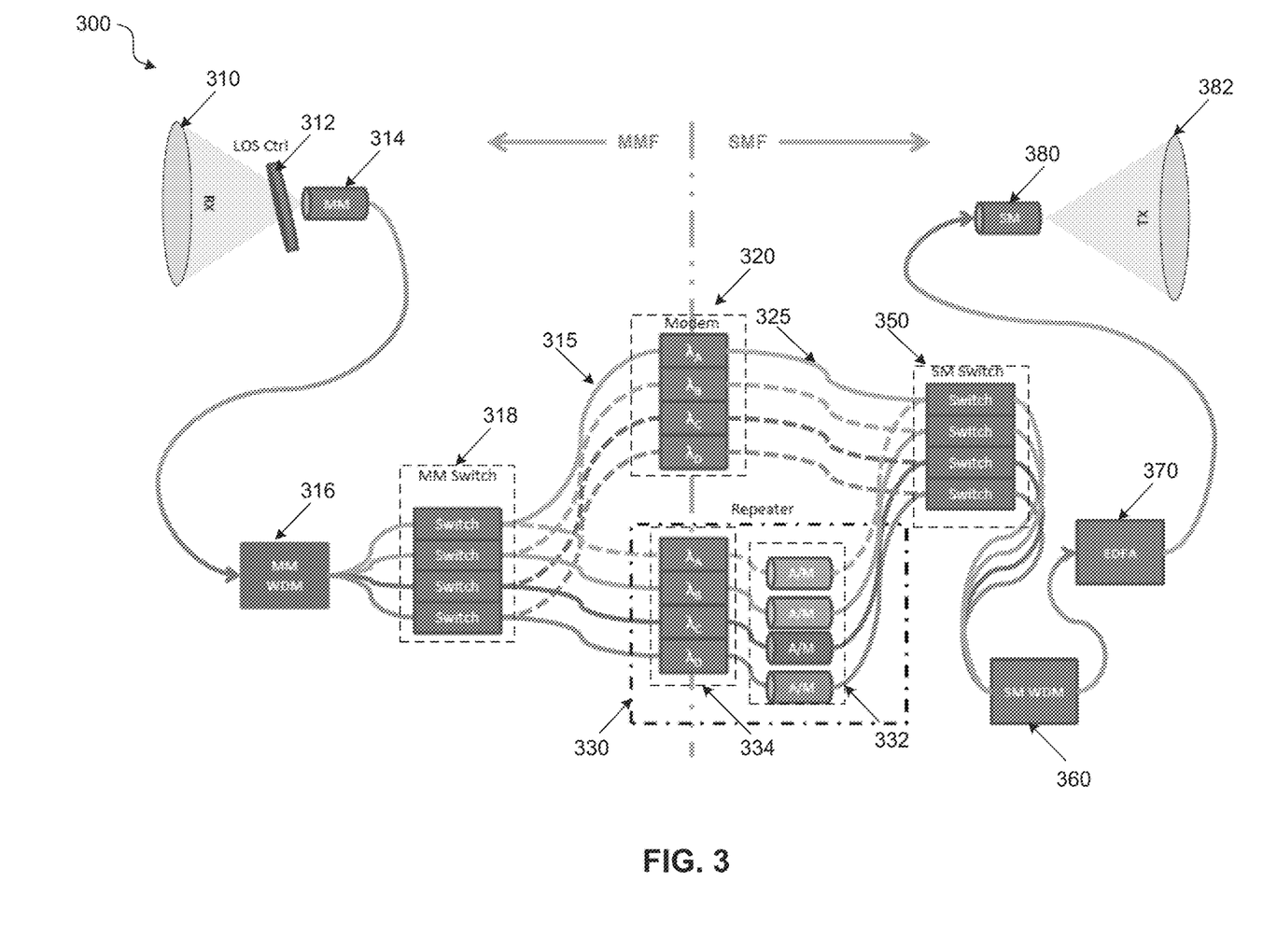
FIG. 3 is a diagram illustrating an example architecture of a multi-mode WDM FSO transceiver including an optical add-drop repeater, according to certain aspects.

FIG. 3 is a diagram illustrating an example architecture of a multi-mode WDM FSO transceiver 300 including an optical add-drop repeater 330, according to certain aspects of the subject technology. The multi-mode WDM FSO transceiver 300 includes a receiver head 310, an LOS controller 312, a MMF 314, a MM WDM 316, a multi-mode switch 318, a modem 320, a repeater 330, a single-mode switch 350, a single-mode WDM 360, an EDFA device 370, a SMF 380, and the transmitter head 382. The receiver head 310, the LOS controller 312 are similar to the receiver head 110, and the LOS controller 112 shown in FIG. 1A and described above. The MMF 314 and the MM WDM 316 are similar to the MMF 214 and the MM WDM 222 of FIG. 2, described above.

In some aspects, the multi-mode switch 318 includes a number N (e.g., 4-16 or more) of channel switches. Each channel switch of the multi-mode switch 318 receives an optical signal associated with a channel (e.g., color, such as optical wavelength) and directs that optical signal to one of the modem 320 or the repeater 330. In the example shown in FIG. 3, the first channel is directed through SMF 315 to the modem 320 and the other three channels (e.g., channels 2-4) are directed to the repeater 330, in other words the first channel is dropped at the modem 320. In one or more aspects, the modem 320 processes a portion of the optical signal of the first channel for use at the corresponding node and sends the remaining portion of the optical signal of the first channel to the single-mode switch 350.

In some implementations, the repeater 330 is an optical-electrical-optical repeater and includes a modem 334 and the A/M circuit 332, which in combination recondition the optical signals of the shown channels 2-4 (e.g., represented by $\lambda_A$, $\lambda_B$, $\lambda_C$, and $\lambda_D$). The reconditioning, as described with respect to repeater 144 of FIG. 1B, can include conversion of optical signals to electrical signals, performing CDR, and reconverting to optical signal (i.e., encoding). The reconditioned optical signals of the channels 2-4 are sent to the single-mode switch 350 to rejoin with (added to) the optical signal of the first channel that was delivered to (i.e., dropped at) the modem 320. The output optical signals of the single-mode switch 350 are fed to the single-mode WDM 360, which is a WDM multiplexer similar to the single-mode WDM 228 described with respect to FIG. 2. The optical signals of the channels (e.g., four channels) are combined, by single-mode WDM 360, into a single optical signal that is fed via a single-mode fiber to the EDFA device 370 and after amplification is carried by SMF 380 to the transmitter head 382. The EDFA device 380 and the transmitter head 382 are similar to the EDFA device 160 and the transmitter head 180 described above with respect to FIG. 1A.

In one or more implementations, the configuration of the multi-mode switch 318 and the single-mode switch 350 can be performed by a processor, for example a local general processor or a microcontroller, not shown in FIG. 3 for simplicity. In some embodiments, the EDFA device can be replaced with a Raman optical amplifier if the L-band (e.g., 1565-1625 nm) is used.

Figure 4:
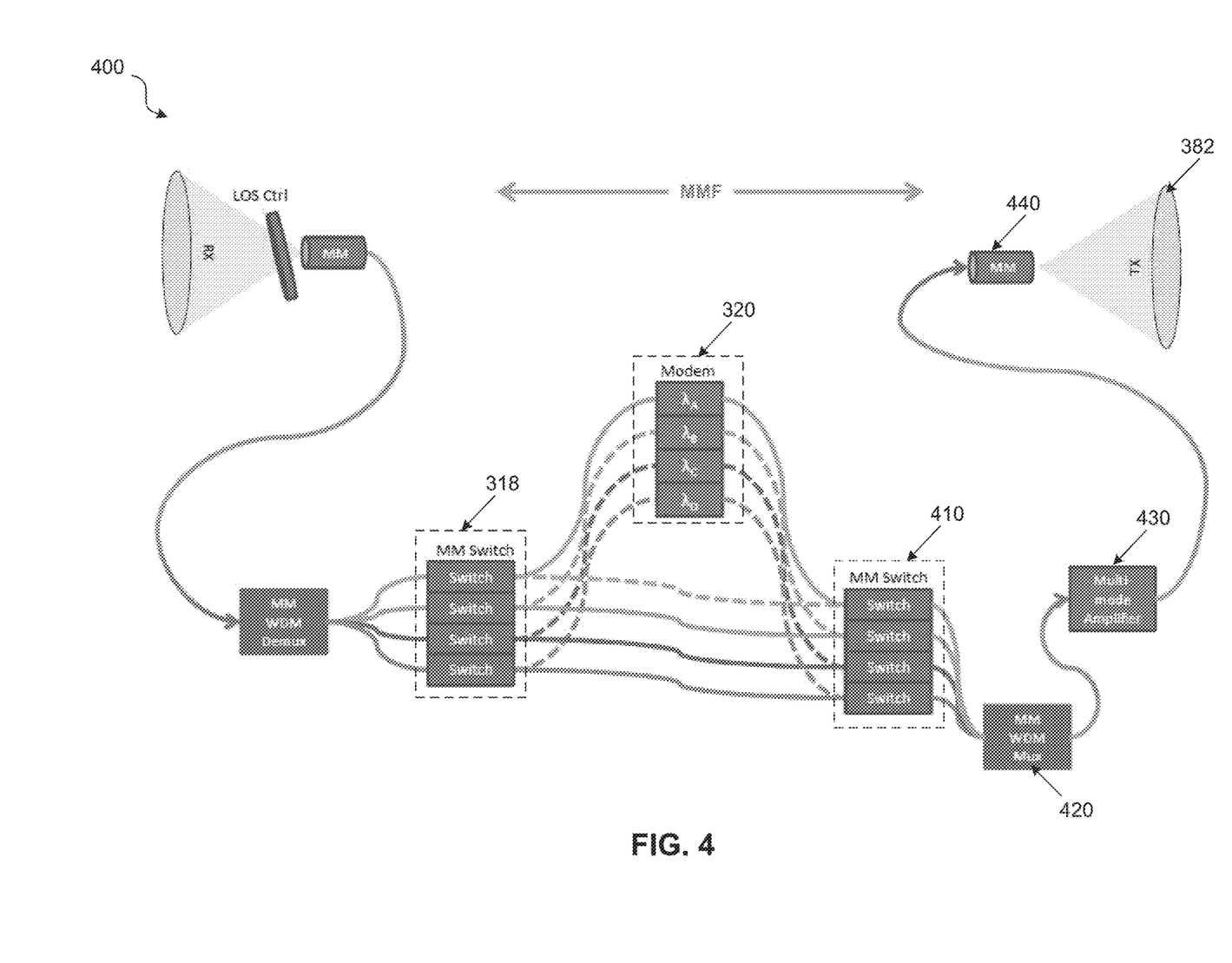
FIG. 4 is a diagram illustrating an example architecture of a multi-mode WDM FSO transceiver including an optical add-drop multi-mode fiber (MMF) amplifier, according to certain aspects.

FIG. 4 is a diagram illustrating an example architecture of a multi-mode WDM FSO transceiver 400 including an optical add-drop multi-mode fiber (MMF) amplifier 410, according to certain aspects of the subject technology. The multi-mode WDM FSO transceiver 400 is similar to the multi-mode WDM FSO transceiver 300 of FIG. 3, except that the repeater 330 of FIG. 3 is omitted and the single-mode signal path after the modem 320 in FIG. 3 is replaced with a multi-mode signal path in FIG. 4. The multi-mode signal path in FIG. 4 includes a multi-mode switch 410, a multi-mode WDM mux 420, a multi-mode amplifier 430, a MMF 440, and the transmitter head 382.

As explained with respect to FIG. 3, optical signals of one or more channels (e.g., channel 1) is dropped at modem 320 and rejoined, at the multi-mode switch 410, with the optical signals of the other channels (e.g., channels 2-4) of the multi-mode switch 318. The multi-mode switch 410 is similar to the multi-mode switch 318 described above with respect to FIG. 3. The multi-mode WDM mux 420 is a thin-film based or Bragg-grating based multi-mode WDM mux. multi-mode WDM mux 420 can combine the optical signals from the multi-mode switch 410 and generate a combined optical signal (e.g., combination of optical signals of channels 1-4) for delivery through a multi-mode fiber to the multi-mode amplifier 430. The multi-mode amplifier 430 can be any optical fiber amplifier. The amplified optical signal from the multi-mode amplifier 450 is delivered via the MMF 440 to the transmitter head 382, described above with respect to FIG. 3.

In one or more implementations, the configuration of the multi-mode switches 318 and 410 can be performed by a processor, for example a local general processor or a microcontroller, not shown in FIG. 4 for simplicity.

Figure 5:
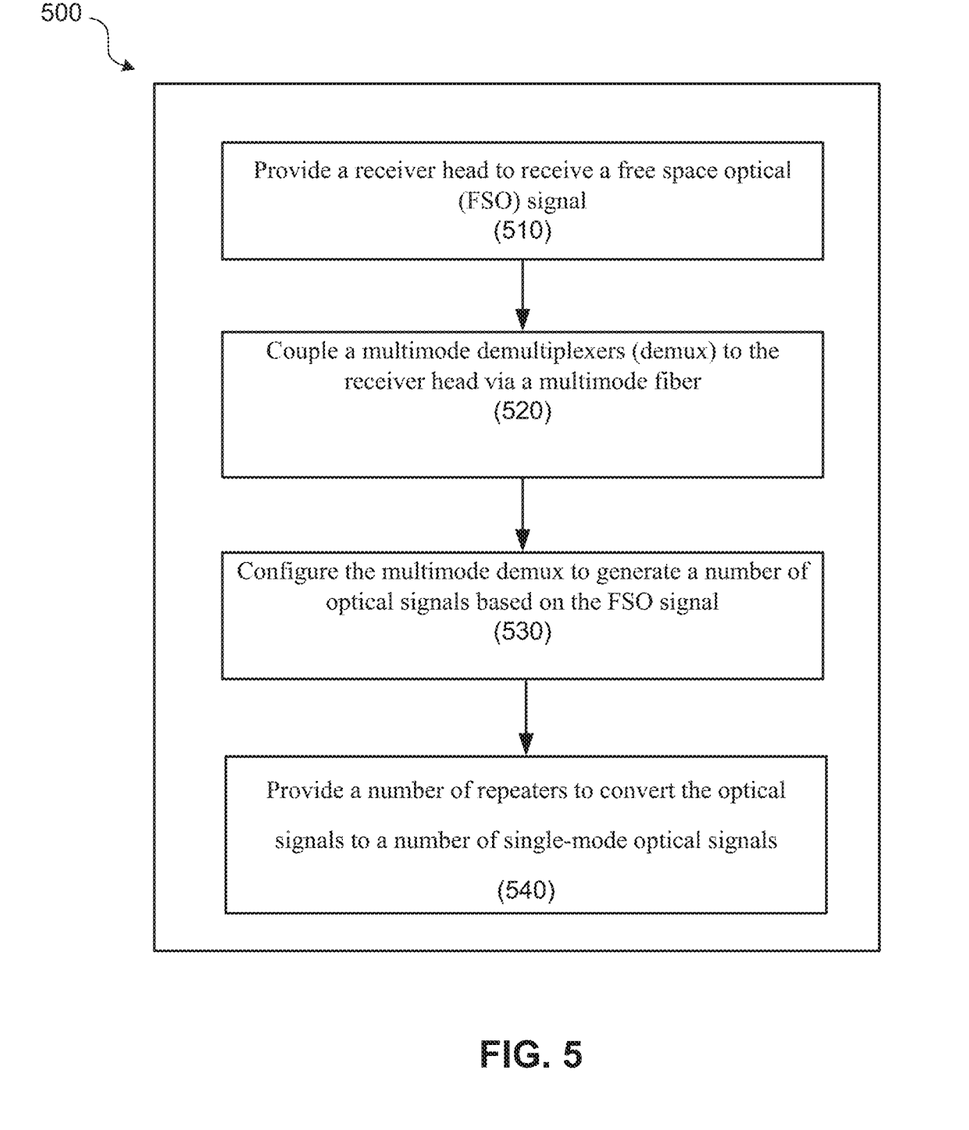
FIG. 5 is a flow diagram illustrating an example of a method for providing a multi-mode WDM receiver, according to certain aspects.

FIG. 5 is a flow diagram illustrating an example of a method 500 for providing a multi-mode WDM receiver, according to certain aspects of the subject technology. The method 500 includes providing a receiver head (e.g., 110 of FIG. 1A) to receive a free-space optical (FSO) signal (510). A multi-mode demux (e.g., 142 of FIG. 1B) is coupled to the receiver head via a multi-mode fiber (e.g., 120 of FIG. 1B) (520). The multi-mode demux generates multiple optical signals based on the FSO signal (530). A number of repeaters (e.g., 144-1 . . . 144-N of FIG. 1B) are provided to convert the optical signals to a number of single-mode optical signals (540).

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A multi-mode wavelength-division multiplexing (WDM) receiver, the WDM receiver comprising:
   a receiver head configured to receive a free-space optical (FSO) signal;
   a multi-mode WDM demultiplexer (demux) coupled to the receiver head via a multi-mode fiber and configured to generate a plurality of optical signals based on the FSO signal;
   a plurality of repeaters configured to modify the plurality of optical signals of the multi-mode WDM demux and to generate a plurality of single-mode optical signals, wherein a repeater of the plurality of repeaters of the WDM receiver comprises an optical-electrical-optical repeater including a detector, an electrical signal reshaping circuit and a transmitter; and
   a single-mode fiber (SMF) reconfigurable optical add-drop module (ROADM) configured to receive the plurality of single-mode optical signals from the plurality of repeaters and to transmit one or more of the plurality of single-mode optical signals to one or more erbium doped fiber amplifier (EDFA) devices.

2. The WDM receiver of claim 1, wherein the receiver head comprises an optical lens including a line-of-sight controller coupled to the multi-mode fiber (MMF).

3. The WDM receiver of claim 1, wherein a channel spacing of the multi-mode WDM demux is less than 400 GHz.

4. The WDM receiver of claim 1, wherein the multi-mode WDM demux comprises a thin-film based or a Bragg-grating WDM demux.

5. The WDM receiver of claim 1, wherein the plurality of optical signals comprise a plurality of single channel optical signals, wherein each of the plurality of single channel optical signals is characterized by a single optical wavelength.

6. The WDM receiver of claim 1, wherein each repeater of the plurality of repeaters comprises a clock-and-data recovery circuit and an optical encoder and is configured to substantially restore a shape and a timing of one of the plurality of optical signals.

7. A multi-mode wavelength-division multiplexing (WDM) transceiver, the transceiver comprising:
   a receiver head configured to receive a free-space optical (FSO) signal; and
   a multi-mode WDM reconfigurable optical add-drop module (ROADM) including a plurality of repeaters and a single-mode fiber (SMF) ROADM and configured to generate a plurality of single-mode optical signals based on the FSO signal, wherein the SMF ROADM is configured to receive the plurality of single-mode optical signals from the plurality of repeaters and to transmit one or more of the plurality of single-mode optical signals to one or more erbium doped fiber amplifier (EDFA) devices, wherein the one or more EDFA devices are coupled to the multi-mode WDM ROADM and are configured to amplify the one or more of the plurality of single-mode optical signals for transmission to one or more transmission heads.

8. The transceiver of claim 7, wherein some of the plurality of single-mode optical signals comprise multi-channel optical signals, wherein each channel of the multi-channel optical signals is characterized by a single optical wavelength.

9. The transceiver of claim 7, wherein some of the plurality of single-mode optical signals comprise single-channel optical signals for transmission through one or more single-mode fibers to a modem, wherein each of the single-channel optical signals is characterized by a single optical wavelength.

10. The transceiver of claim 7, wherein the multi-mode WDM ROADM comprises a multi-mode demultiplexer (demux).

11. The transceiver of claim 10, wherein the multi-mode demux comprises a dense WDM (DWDM) demux having a channel spacing of less than 400 GHz.

12. The transceiver of claim 11, wherein the DWDM demux comprises a thin-film based or a Bragg-grating based DWDM demux.

13. The transceiver of claim 7, wherein the receiver head comprises an optical lens and is equipped with a line-of-sight controller, and wherein the receiver head is coupled to a multi-mode fiber (MMF).

14. A method for providing a multi-mode wavelength-division multiplexing (WDM) receiver, the method comprising:
  providing a receiver head to receive a free-space optical (FSO) signal;
  coupling a multi-mode WDM demultiplexer (demux) to the receiver head via a multi-mode fiber and configuring the multi-mode WDM demux to generate a plurality of optical signals based on the FSO signal;
  providing a plurality of repeaters to convert the plurality of optical signals of the multi-mode WDM demux to a plurality of single-mode optical signals; and
  coupling a single-mode fiber (SMF) reconfigurable optical add-drop module (ROADM) to the plurality of repeaters to receive the plurality of single-mode optical signals from the plurality of repeaters and to transmit one or more of the plurality of single-mode optical signals to one or more erbium doped fiber amplifier (EDFA) devices.

15. The method of claim 14, wherein the channel spacing of the multi-mode WDM demux is less than 400 GHz.

16. The method of claim 14, wherein configuring the multi-mode WDM demux to generate the plurality of optical signals comprise configuring the multi mode demux to generate a plurality of single channel signals, wherein each of the plurality of single channel signals is characterized by a single optical wavelength.

17. The method of claim 14, wherein providing each repeater of the plurality of repeaters comprises providing an optical detector, a clock and data recovery circuit, and an optical encoder, and the method further comprises configuring each repeater of the plurality of repeaters to substantially restore a shape and a timing of one of the plurality of optical signals.

* * * * *